UNITED STATES PATENT OFFICE.

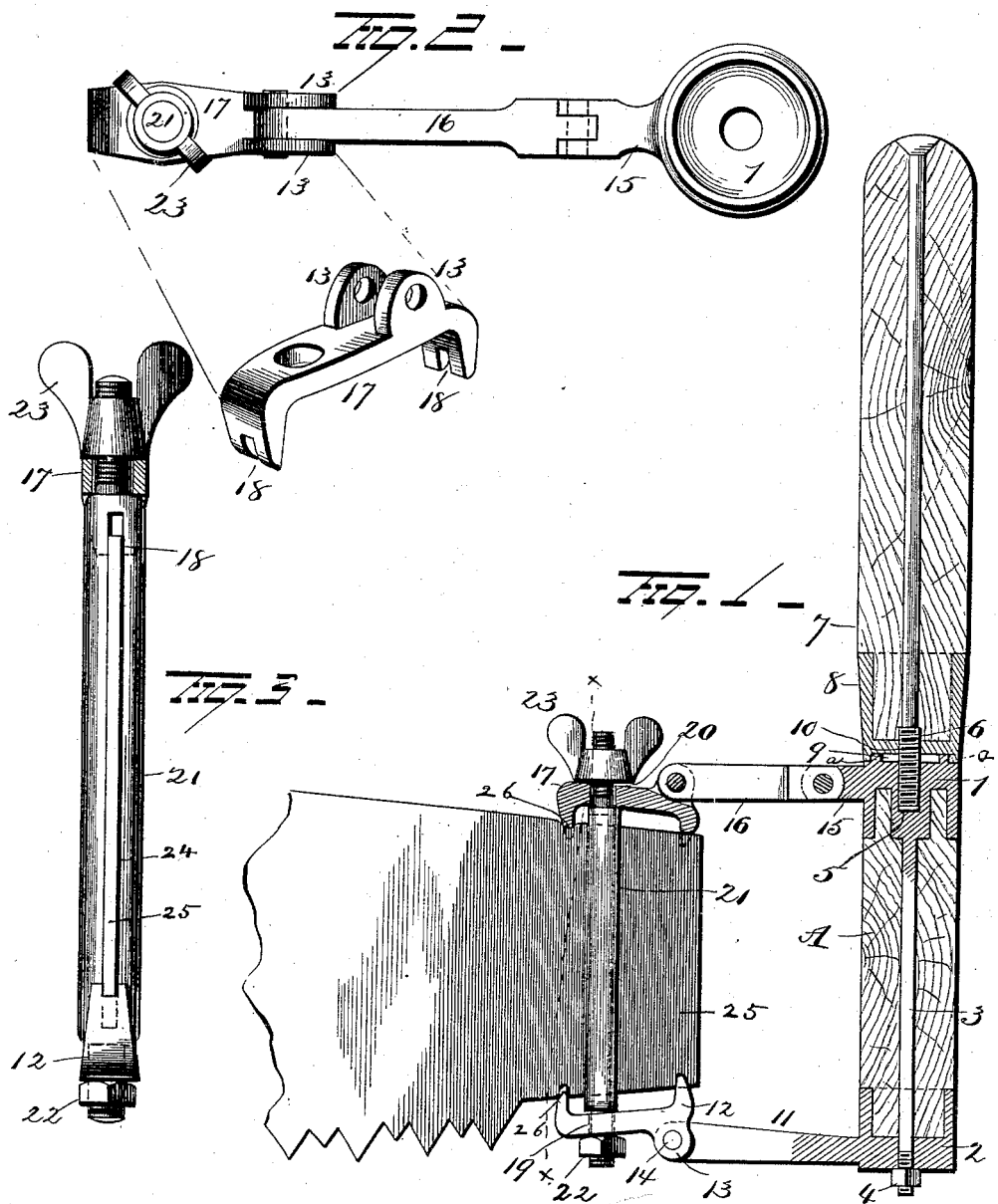

EDWARD ENGLAND, OF DULUTH, MINNESOTA.

SAW-HANDLE.

SPECIFICATION forming part of Letters Patent No. 426,528, dated April 29, 1890.

Application filed September 18, 1889. Serial No. 324,320. (No model.)

*To all whom it may concern:*

Be it known that I, EDWARD ENGLAND, of Duluth, in the county of St. Louis and State of Minnesota, have invented certain new and useful Improvements in Saw-Handles; and I do hereby declare the following to be a full, clear, and exact description of the invention, such as will enable others skilled in the art to which it appertains to make and use the same.

My invention relates to an improvement in tool-handles, and more particularly to handles for crosscut-saws.

The object is to provide an improved handle for crosscut-saws so constructed that when attached to the saw the saw can be used with equal facility for cutting down timber, cutting timber from the top, and undercutting.

A further object is to so construct the handle of a saw that it can be readily and quickly secured to and removed from the saw-blade.

A further object is to provide a saw-handle which may be readily secured to and removed from saw-blades of varying sizes.

With these objects in view my invention consists in certain novel features of construction and combinations and arrangements of parts, as hereinafter set forth, and pointed out in the claims.

In the accompanying drawings, Figure 1 is a sectional elevation of my improved saw-handle having a saw-blade secured thereto. Fig. 2 is a view in plan of the hinged arm and clamping-jaw, also showing the clamping-jaw in perspective; and Fig. 3 is a view on the line *x x* of Fig. 1.

A represents a handle, preferably of wood, having ferrules 1 2 secured upon its ends. A rod 3 is made integral with or secured to the interior of the ferrule 1, and, passing through a perforation made in the handle for its accommodation, projects through the ferrule 2, where it is screw-threaded for the reception of a retaining-nut 4. That portion of the rod 3 which joins the ferrule 1 is enlarged somewhat and provided with an internal screw-threaded socket 5 for the reception of the screw-threaded stem 6 of an auxiliary handle 7. The auxiliary handle 7 is provided on its inner end with a ferrule 8, having a recess 9 and a perforation 10 in its end, the latter permitting the passage of the screw-threaded stem 6, and the former being adapted for the reception of a flange *a* on the ferrule 1 when the auxiliary handle is secured to its place.

Made integral with and projecting at right angles from ferrule 2 is an arm 11, to the lower end of which a clamping-jaw 12 is pivotally connected. This clamping-jaw is provided on its back with ears 13, between which the free end of the arm 11 is inserted and pivotally held by means of a pivot-pin 14.

Projecting from the ferrule 1 is a bifurcated lug 15, between the ears of which the upper end of an arm 16 is pivoted, thus producing a hinge-joint between said arm and ferrule 1. Pivotally connected to the free end of the arm 16 is a clamping-jaw 17, similar in all respects to the jaw 12. Both the jaws 12 and 17 are preferably provided with notches 18 for the reception of the edges of the saw-blade, as presently explained. The clamping-jaws are provided with aligned perforations 19 20 at points below their pivotal connection with the arms 11 16 for the reception of a rod 21, the ends of which are screw-threaded and adapted to pass loosely through said perforations. The end of the rod 21, which passes through the jaw 12, is provided with a retaining-nut 22, and the end of the rod which passes through the jaw 17 is provided with a thumb-nut 23, for a purpose which will presently be made clear. The rod 21 is provided with a longitudinal slot 24, extending from one screw-threaded portion thereof to the other and of sufficient size to accommodate one end of a saw-blade 25. The thumb-nut 23 being screwed back to permit the hinged arm 16 to be swung back, the end of the saw-blade is inserted through the slot 24 of rod 21, the edges of the blade being in line with the notches of the jaws 12 17. The thumb-nut is now screwed up and the clamping-jaws made to approach and clamp the saw-blade, which may be provided with notches 26 for the reception of the jaws. It will be seen that as the jaws 12 17 are pivotally connected to the arms 11 16 they will adapt themselves to the edges of the saw-blade, and that as one of the arms is hinged to the handle proper saw-blades of varying sizes may be used with the same handle.

Slight changes might be made in the constructive details of my invention without departing from the spirit thereof or limiting its scope. Hence I do not wish to limit myself to the precise details of construction herein described; but, Having fully described my invention, what I claim as new, and desire to secure by Letters Patent, is—

1. A saw-handle having arms projecting therefrom and jaws pivoted to said arms, and means for clamping said jaws to the saw-blade, substantially as set forth.

2. A saw-handle having one rigid and one hinged arm, jaws pivoted to each arm, and means for clamping said jaws to the saw-blade, substantially as set forth.

3. A saw-handle having arms projecting therefrom, jaws pivoted to said arms, a slotted rod passing through perforations in said jaws, and a thumb-nut on said rod to clamp the jaws to the saw-blade, substantially as set forth.

4. A saw-handle having arms projecting therefrom, jaws pivoted to said arms, a slotted rod passing through perforations in the jaws, and a thumb-nut on said rod to clamp the jaws to the saw-blade, substantially as set forth.

5. The combination, with a handle, of ferrules secured to the ends thereof, arms projecting from said ferrules, jaws pivoted to the arms, and means for clamping said jaws to the blade, substantially as set forth.

6. The combination, with a handle, of ferrules secured to the ends thereof, a rod secured to one of said ferrules and passing through the handle and the other ferrule, arms projecting from the ferrules, jaws pivoted to the arms, and means for clamping said jaws to a saw-blade, substantially as set forth.

In testimony whereof I have signed this specification in the presence of two subscribing witnesses.

EDWARD ENGLAND.

Witnesses:
J. W. MARINE,
A. R. RIDGELY.